United States Patent
Newberth, III et al.

(10) Patent No.: US 6,828,400 B1
(45) Date of Patent: Dec. 7, 2004

(54) WASHABLE IMPREGNATION COMPOSITIONS

(75) Inventors: Frederick F. Newberth, III, West Hartford, CT (US); Peter J. Chupas, Port Jefferson, NY (US)

(73) Assignee: Henkel Corporation, Rocky Hill, CT (US)

( * ) Notice: Subject to any disclaimer, the term of this patent is extended or adjusted under 35 U.S.C. 154(b) by 314 days.

(21) Appl. No.: 10/018,808

(22) PCT Filed: Jul. 21, 2000

(86) PCT No.: PCT/US00/20076

§ 371 (c)(1),
(2), (4) Date: Dec. 21, 2001

(87) PCT Pub. No.: WO01/07530

PCT Pub. Date: Feb. 1, 2001

Related U.S. Application Data

(60) Provisional application No. 60/144,896, filed on Jul. 21, 1999.

(51) Int. Cl.[7] .......................... C08F 222/10; C08F 4/04; C08F 4/32

(52) U.S. Cl. .................... 526/321; 526/219.6; 526/227; 526/230; 526/320; 523/176

(58) Field of Search ....................... 523/176; 526/219.6, 526/227, 230, 320, 321

(56) References Cited

U.S. PATENT DOCUMENTS

| | | | | |
|---|---|---|---|---|
| 3,651,036 A | * | 3/1972 | Watanabe et al. | 526/320 |
| 3,775,385 A | * | 11/1973 | Ozono et al. | 526/211 |
| 3,969,552 A | * | 7/1976 | Malofsky et al. | 427/295 |
| 4,602,073 A | * | 7/1986 | Skoultchi et al. | 526/208 |
| RE32,240 E | * | 9/1986 | DeMarco | 526/328 |
| 6,048,604 A | * | 4/2000 | Brault et al. | 428/199 |

* cited by examiner

*Primary Examiner*—Tae H. Yoon
(74) *Attorney, Agent, or Firm*—Steven C. Bauman

(57) ABSTRACT

Anaerobic and heat curing polymerizable impregnation compositions for sealing pourous articles are disclosed. The compositions contain glycerol, oxygenated glycerol or (meth)acrylate glycerol to improve the washability of the compositions in aqueous solutions. The compositions may contain other compounds to effect the curing characteristics of the sealants.

14 Claims, No Drawings

WASHABLE IMPREGNATION COMPOSITIONS

This application is a 371 of international application PCT/US00/20076, filed Jul. 21, 2000, which claims the benefit of U.S. Provisional Application Ser. No. 60/144,896, filed Jul. 1, 1999.

FIELD OF THE INVENTION

The present invention relates generally to washable, polymerizable compositions. More particularly, the present invention relates to such compositions curable through mechanisms, anaerobic and heat, for use as impregnation sealants.

BRIEF DESCRIPTION OF RELATED TECHNOLOGY

Impregnation sealing of porosity in porous parts frequently is carried out by introducing sealant compositions into the porosity under a pressure differential, by vacuum techniques which are well known in the art.

Sealant compositions typically employed in these impregnation applications include a wide variety of self-curing anaerobic sealants, e.g., the compositions described in U.S. Pat. Nos. 3,672,942; 3,969,552; Re. 32,240; and U.S. Pat. No. 4,632,945, which are curable through free-radical polymerization in the presence of suitable free-radical initiators, e.g., peroxy-type initiators, as well as thermal-curing sealants, e.g., the compositions described in U.S. Pat. Nos. 4,416,921 and 4,416,921, as well as sealants which cure by both anaerobic and heat cure mechanisms.

One problem common to many impregnation sealants is the accumulation of excess sealant on the outer surface of parts. Excess sealant is removable by normal abrasion or by contact with various liquids. The removal of extraneous or surface accumulation of anaerobic and heat curing sealants from the parts is important because such residues can readily contaminant the environment of porous parts. In addition, such surface sealant deposits may, by virtue of their thickness, cause the impregnated product part to vary from the desired dimensional specifications. This often renders the part deficient or even useless for its intended function in applications requiring close dimensional tolerances.

Furthermore, such surface sealant deposits may interfere with subsequent painting, plating, or assembly operations or cause delamination of applied paint or plated films which frequently are performed on porous articles subsequent to their impregnation. Specifically, such surface sealant deposits may be removed during painting or plating operations, resulting in contamination of the baths used in such operations, and may interfere with the adhesion of paint, plating, and the lie to the impregnated part.

To remove excess sealant from impregnated articles, agitated rinse times of significant duration are required. The actual rinse time will depend upon, among other things, the nature of the article, such as porosity, and the washability of the uncured sealant in an aqueous solution. Often such rinse operations are from about five to about twenty minutes, but actual rinse times for any particular article may be even longer in duration. In addition, chemicals, such as surfactants or detergents, may also be added to the aqueous solution to facilitate the removal of sealant deposits.

For example, U.S. Pat. No. 3,672,942 to Neumann et al. discloses an anaerobic impregnant comprising a free-radical polymerizable acrylate ester monomer and free-radical polymerization initiator, which requires an organic solvent, such as a halogenated hydrocarbon, to remove uncured impregnant from the outer surface of a porous article.

U.S. Pat. No. 3,969,552 to Malofsky et al. describes a washing process for removing excess impregnant from the surface of the porous article after porosity impregnation. The disclosed impregnation composition comprises an acrylic anaerobic curing resin and a peroxy initiator therefor. The wash solution is an aqueous solution of a nonionic surfactant of specified formula which is necessary for the removal of uncured impregnant.

U.S. Pat. No. Re. 32,240 to DeMarco describes a self-emulsifying anaerobic composition for porosity impregnation applications, comprising an anaerobically curing monomer such as an acrylic ester, a peroxy initiator therefor, e.g., a hydroperoxide or perester, an anionic or nonionic surfactant which is dissolved in the composition and renders it self-emulsifying upon mixing with water.

U.S. Pat. No. 5,256,450 to Catena describes an anaerobic polymerizable acrylate composition which requires a mixture of three different polymerizable acrylates in specific amounts to obtain a composition that cures and rinses without the use of organic solvents or surfactants.

The above-described anaerobic sealant compositions are typically impregnated into the porosity of metal parts by vacuum and pressure techniques. A vacuum removes air from the porosity of the metal parts. Sealant compositions are then introduced into the porosity under a pressure differential using ambient pressure or elevated pressure conditions. After impregnation, an operation, such as a centrifuge operation, removes excess surface sealant from the metal part. Even after such removal of gross surface accumulations of the impregnant, there is a significant amount of impregnant at the surface of the porous articles, particularly in the vicinity of the pores. When the impregnant is anaerobically cured, the aforementioned surface accumulations as well as the outermost layer of the impregnant in the pores of the article, particularly shallow surface pores, are in contact with oxygen, so that such surface quantities of the impregnant are uncured or only partially cured.

Remaining surface sealant or sealant trapped in blind holes of the impregnated parts is typically removed in an agitated water rinse zone. The impregnated and water-rinsed parts may be transferred to an activator zone in which the impregnated parts are contacted with a catalyst activator solution, to effect curing of the sealant material at the entrance to the pores in the parts. This creates a hardened plug or cap of sealant material in the outer portion of the pore, trapping the resin for anaerobic self-cure.

Thereafter, the impregnated parts may be transferred to a final rinse zone for removal of the activator solution from the impregnated parts. This final rinse solution may be at elevated temperature, e.g., on the order of about 50° C., to warm the impregnated parts for quick drying, and to accelerate curing of the anaerobic impregnant within the interior porosity of the article, the rate of such cure increasing with increasing temperature.

As a variation on the above-described impregnation system, it is known to utilize a heat-curing resin in place of the anaerobically-curing resin, whereby the activating and final rinsing steps previously described are eliminated in favor of a hot rinse final step. In the heat-curing resin impregnation system, after impregnation and rinsing of excess surface material, the parts are contacted with hot water at temperatures on the order of about 50° C. to about 90° C. to cure the impregnant resin.

Among the previously developed heat-curing impregnating compositions for sealing porous parts are the compositions disclosed in the patents identified and discussed below.

U.S. Pat. No. 4,416,921 to Dunn describes a heat-curing sealant composition which contains a polymerizable acrylic monomer, an azonitrile and an anionic or nonionic surfactant to render the composition self-emulsifying upon mixing with water.

U.S. Pat. No. 4,147,821 to Young describes a heat-curing sealant composition which contains (meth)acrylic monomer and a polyfunctional acrylic monomer. An emulsifier is required to aid in the rinsing of uncured sealant from the surface of a porous article.

Once the heat-curable impregnant composition is introduced into the porosity of the parts to be sealed, the parts are transferred to an agitated water rinse zone for removal of any remaining surface accumulations of sealant or extraneous sealant which is trapped in blind holes of the impregnated parts. After removal of the excess sealant in the agitated water rinse zone, the impregnated parts are passed to a tank containing hot water, e.g., at a temperature of 90° C. to 150° C., or other medium at elevated temperature which serves to cure the sealant composition in the porosity. Relative to anaerobic impregnant compositions, heat-curable impregnant compositions may be effectively used with a minimum of monitoring and maintenance, with little or no aeration being required.

In all of the above-described impregnation compositions and systems, either organic solvents or specific surfactants are used to remove uncured sealant in a reasonable rinse time or specific multi-component sealant compositions are used to avoid excessive rinse times.

Accordingly, there is a need to provide a heat-curable and/or an anaerobic impregnating sealant without these and other disadvantages.

SUMMARY OF THE INVENTION

The present invention provides washable compositions for sealing porous articles which have improved washability characteristics and reduced rinsing requirements. The present compositions achieve lower rinse times while producing improved surface cleaning of uncured polymer. The compositions of the present invention demonstrate utility in the sealing and/or aqueous rinsing operations, and obviate the conventional use of multi-component cleaning systems.

In particular, the present invention provides a sealant composition with improved washability, thereby reducing the rinse duration, improved ease of use by eliminating the need for specific surfactants, and which improve surface cleanliness of the porous article.

In one embodiment of the present invention, the inventive composition includes a curable (meth)acrylate glycerol, and is self-emulsifying upon mixing with water to facilitate aqueous rinsing of uncured composition. The inventive composition further includes curing initiators and curing accelerators to promote anaerobic or thermal curing through free radical mechanisms.

In another embodiment of the present invention, the invention composition includes a polymerizable composition and further includes a compound selected from the group consisting of glycerol, oxylated glycerol, (meth)acrylate glycerol and combinations thereof which improve the washability of the inventive sealants in aqueous solutions.

In one desirable embodiment, the inventive composition contains an (meth)acrylate glycerol which has at least one terminal (meth)acrylate group to allow crosslinking of the meth)acrylate glycerols upon curing.

DETAILED DESCRIPTION OF THE INVENTION

The present invention is directed to a sealant composition with improved washability characteristics as compared to known sealant compositions. The present invention provides sealant compositions, the components of which serve to provide washability and self-emulsificability to the overall composition. These components may be included with the inventive sealant composition during the impregnation operation or may be incorporated during the water rinse operation to provide washability and self-emulsificability to the overall composition. Uncured sealant is typically removed from the surface of the porous article during the aqueous rinse portion of the sealing process. As used herein the term "washable" and its variants refer to the ability of a sealant composition to emulsify in an aqueous solution and be readily removed from unwanted areas of an article in the aqueous solution. Also, as used herein the term "self-emulsificability" and its variants refer to the ability of one liquid to form minute droplets in a second liquid resulting in a heterogeneous mixture of two liquid phases.

The present compositions employ an independent component selected from the group consisting of glycerol, oxylated glycerol, (meth)acrylate glycerol and combinations thereof as an additive to anaerobic or heat curable polymerizable compositions. The polymerizable composition includes polyfunctional and monofunctional (meth)acrylate esters to effectuate the polymerizable properties of the sealant. The inventive sealant compositions may contain other components to tailor the polymerizing, curing or emulsifing properties of the compositions. The inventive sealants also contain an initiator system and/or inhibitor systems to provide controlled anaerobic or thermal curing mechanisms. These compositions have a variety of uses, including an impregnation compositions, sealants, adhesives, coatings and the like. One particularly desirable embodiment relates to impregnation sealant compositions for porous parts.

The inventive compositions are generally curable by free-radical mechanisms. Typically, anaerobic conditions or elevated temperature condition may be used. In impregnation applications, however, generally anaerobic and/or thermal mechanisms are used. Furthermore, the inventive compositions are self-emulsifying upon mixing with water to facilitate the aqueous rinsing of an impregnated article.

In one embodiment of the inventive composition the washability and self-emulsificability enhancing component in the form of glycerol is incorporated into the resultant polymer backbone. This composition includes a curable (meth)acrylate glycerol component having the formula:

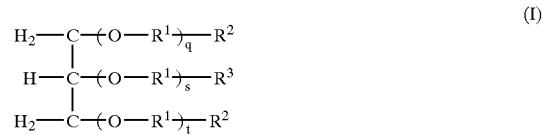

wherein $R^1$ is a substituted or unsubstituted $C_1$ to $C_5$ alkyl or a combination thereof, $R^2$ and $R^3$ are independently selected from the group consisting of hydroxyl, (meth)acrylate and combinations thereof, provided that at least one $R^2$ is a (meth)acrylate, where q, s and t are independently from about 0 to about 35; and a free radical initiator component or system for producing free radicals to initiate cure of said composition. The short chain $C_1$ to $C_5$ alkyl groups, as compared to longer chain alkyl groups, assist in the washability of the inventive compositions. Longer chain alkyl groups can act negatively to retard emulsification. Desirably, $R^1$ is an ethyl, a propyl or combinations thereof. The (meth)acrylate glycerol compositions produce cross-linked polymers upon curing which serve as effective and durable self-washing sealants. The free radical initiator component provides free radicals for both anaerobic or heat curing of the composition.

The inventive compositions may contain from about 50% to about 99% (meth)acrylate glycerol by weight of the total composition with the balance including other materials, for instance, initiators, inhibitors, surfactants, inserts, for instance, non-reactive plasticizers, and the like.

The (meth)acrylate glycerol compositions may be suitably prepared by condensing hydroxyalkyl (meth)acrylate, such as hydroxyethy(meth)acrylate (HEMA), onto hydroxyl groups of an oxylated glycerol, such as an oxylated glycerol of formula VI below.

In an alternate embodiment, the inventive compositions include a self-washing polymerizable di(meth)acrylate glycerol having the formula:

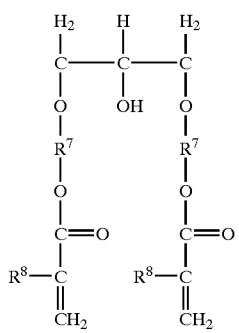

(II)

wherein $R^7$ is an ethyl or propyl [alkyl] and $R^8$ is hydrogen or methyl; and a free radical initiator component or system.

Furthermore, in still another embodiment the inventive sealant composition may include at least one crosslinkable polymer, a curing component for said polymer and a compound selected from the group consisting of glycerol, oxylated glycerol, (meth)acrylate glycerol and combinations thereof. Desirably, the polymerizable component has a majority of polyfunctional (meth)acrylate esters (hereinafter, poly(meth)acrylate esters). These polyfunctional esters produce cross-linked polymers, which serve as effective and durable sealants, adhesives and coatings. While various (meth)acrylate esters may be used, desirable poly(meth)acrylate esters include those with the following general formula:

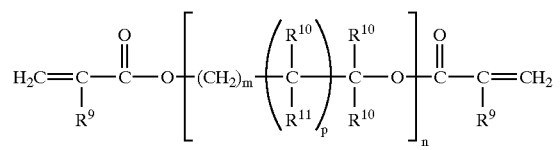

(III)

wherein $R^{10}$ represents a radical selected from the group consisting of hydrogen, lower alkyl of from 1 to about 4 carbon atoms, hydroxyalkyl of from 1 to about 4 carbon atoms and

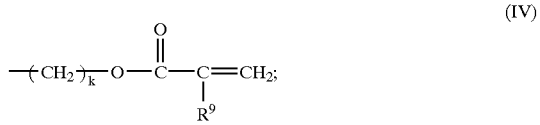

(IV)

$R^9$ is a radical selected from the group consisting of hydrogen, halogen, and lower alkyl of from 1 to about 4 carbon atoms; $R^{11}$ is a radical selected from the group consisting of hydrogen, hydroxyl, and

(V)

and m may be 0 to 12, and desirably from 0 to about 6; n is equal to at least 1, e.g., 1 to about 20 or more, and desirably between about 2 to about 6; k is 1 to about 4; and p is 0 or 1.

The polymerizable poly(meth)acrylate esters corresponding to the above general formula are exemplified by, but not restricted to, the following materials: di-, tri- and tetraethyleneglycol dimethacrylate, dipropyleneglycol dimethacrylate; polyethyleneglycol dimethylacrylate (PEGMA); di(pentamethyleneglycol) dimethacrylate; tetraethyleneglycol diacrylate; tetraethyleneglycol di(chloracrylate); diglycerol diacrylate; diglycerol tetramethacrylate; tetramethylene dimethacrylate; ethylene dimethacrylate; and neopentylglycol diacrylate. Combinations and derivatives of these polyfunctional materials are contemplated. Monofunctional (meth)acrylate esters (esters containing one (meth)acrylate group) are also advantageously used in the present compositions. The most common of these monofunctional esters include the alkyl esters such as lauryl methacrylate. Many of the lower molecular weight alkyl esters are quite volatile, and frequently it is more desirable to use a higher molecular weight homolog, such as decyl methacrylate or dodecyl methacrylate, or any other fatty acid acrylate esters, in (meth)acrylate-based impregnant compositions.

When monofunctional (meth)acrylate esters are employed in the present compositions, it is desirable to use an ester which has a relatively polar alcohol moiety. Such materials are less volatile than low molecular weight alkyl esters and, in addition, the polar group tends to provide intermolecular attraction in the cured polymer, thus producing a more durable seal. Desirably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate (HEMA), hydroxypropyl methacrylate (HPMA), t-butylaminoethyl methacrylate, cyanoethylacrylate, and chloroethylmethacrylate. Combinations of monofunctional (meth)acrylate are contemplated.

When poly(meth)acrylate esters and monofunctional (meth)acrylate esters are employed together in the present compositions, the ratio of poly(meth)acrylate esters to monofunctional (meth)acrylate esters on a weight basis is generally about 0.05:1 to about 20:1. Desirably, for use in impregnation compositions the ratio is about 5:1. Furthermore, the inventive curable (meth)acrylate glycerol compounds can be combined with such esters in amounts of about 0.1% to about 99% by weight of the total composition. In other words, the washability of such esters can be improved by combining various amounts of (meth)acrylate glycerol.

In yet another embodiment of the present invention, a glycerol or an oxylated glycerol is combined with polymerizable sealant compositions to further improve washability thereof. The oxylated glycerol may be incorporated into the sealant composition or may be added separately into the aqueous rinse solution used to wash the sealant compositions thereby aiding in the removal of uncured surface and extraneous sealant from the surface of the part.

The oxylated glycerols of the present invention have the formula:

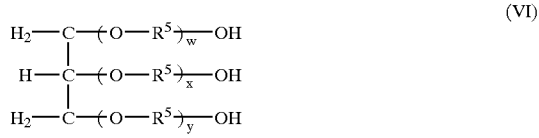

(VI)

wherein $R^5$ is a substituted or unsubstituted $C_1$ to $C_5$ alkyl or a combination thereof and w, x and y are independently from about 0 to about 35. Desirably, $R^5$ is an ethyl, a propyl or combinations thereof.

When poly(meth)acrylate esters and monofunctional (meth)acrylate esters are employed together in the present compositions, the ratio of poly(meth)acrylate esters to monofinctional (meth)acrylate esters on a weight basis is generally about 0.05:1 to about 20:1. Desirably, for use in impregnation compositions the ratio is about 5:1. Furthermore, the inventive oxylated glycerols can be combined with such esters in amounts of about 0.1% to about 75% by weight of the total composition. In other words, the washability of such esters can be improved by combining various amounts of oxylated glycerols.

The compositions of the present invention may be anaerobically curable through a free-radical mechanism, with an initiator being present therein, or an initiator system comprising a redox polymerization initiator (i.e., an ingredient or a combination of ingredients which produce an oxidation-reduction reaction, resulting in the production of free radicals). Suitable initiators include peroxy materials e.g., peroxides, hydroperoxides, and peresters, which are capable of inducing polymerization of the inventive compositions in the substantial absence of oxygen, and yet not induce polymerization as long as oxygen is present. Organic hydroperoxides are the desirable peroxy materials with t-butyl hydroperoxide and cumene hydroperoxide being particularly useful with the inventive compositions.

In addition to initiator components, the composition of the present invention may include various initiator accelerators, as for example hydroperoxide decomposition accelerators, when hydroperoxides are used as cure initiators in the sealant material. Typical examples of potentially suitable accelerators include: tertiary amines such as tributyl amine; sulfimides such as benzoic sulfimide (or saccharin); formamide; and compounds containing transition metals, such as copper octanoate.

The inventive compositions may also be heat-curable compositions through a free-radical mechanism, with a heat-cure initiator being present therein, or an initiator system comprising a redox polymerization initiator (i.e., an ingredient or a combination of ingredients which at the desired elevated temperature conditions, e.g. from about 90° to about 150° C., produce an oxidation-reduction reaction, resulting in the production of free radicals). Suitable initiators may include peroxy materials, e.g., peroxides, hydroperoxides, and peresters, which under appropriate elevated temperature conditions decompose to form peroxy free radicals which are initiatingly effective for the polymerization of the inventive compositions.

Another useful class of heat-curing initiators comprises azonitrile compounds which yield free radicals when decomposed by heat. Heat is applied to cure the composition, and the resulting free radicals initiate polymerization of the inventive composition.

For example, azonitrile may be a compound of the formula:

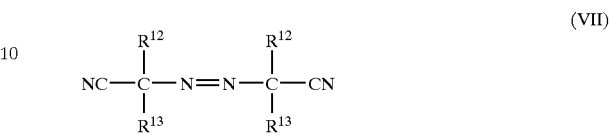

(VII)

wherein $R^{12}$ is a methyl, ethyl, n-propyl, iso-propyl, iso-butyl or n-pentyl radical, and R13 is a methyl, ethyl, n-propyl, iso-propyl, cyclopropyl, carboxy-n-propyl, iso-butyl, cyclobutyl, n-pentyl, neo-pentyl, cyclopentyl, cyclohexyl, phenyl, benzyl, p-chlorbenzyl, or p-nitrobenzyl radical or $R^{12}$ and $R^{13}$, taken together with the carbon atom to which they are attached, represent a radical of the formula

(VIII)

wherein m is an integer from 3 to 9, or the radical

(IX)

Compounds of the above formula are more fully described in U.S. Pat. No. 4,416,921, the disclosure of which hereby is incorporated herein by reference.

Azonitrile initiators of the above-described formula are readily commercially available, e.g., the initiators which are commercially available under the trademark VAZO® from E.I. DuPont de Nemours and Company, Inc. (Wilmington, Del.), including VAZO® 52 ($R^{12}$=methyl, $R^{13}$=isobutyl), VAZO® 64 ($R^{12}$=methyl, $R^{13}$=methyl), and VAZO® 67 ($R^{12}$=methyl, $R^{13}$ =ethyl), all such $R^{12}$ and $R^{13}$ constituents being identified with reference to the above-described azonitrile general formula.

A desirable azonitrile initiator is 2,2'-azobis(isobutyronitrile) or AZBN.

The azonitrile may be employed in the inventive heat-curable compositions in concentrations on the order of about 500 to about 10,000 parts per million (ppm) by weight, desirably about 1000 to about 5000 ppm.

Other (meth)acrylic monomer-based impregnant compositions of a heat-curable character may be employed in the broad practice of the present invention, including those disclosed in UK Patent Specifications 1,308,947 and 1,547,801. As described in these references, the monomeric impregnant composition may contain suitable inhibitors serving to restrict or preclude the occurrence of polymerization of the monomer, at temperatures below those desired or recommended for heatcuring of the impregnant composition.

The inventive impregnant compositions may also contain other constituents, such as: other co-monomer species, reactive diluents, pigments, surfactants, fillers, polymerization inhibitors, stabilizers, anti-oxidants, anti-corrosion additives, and the like. For example, surfactants may be combined with the inventive compositions or included in the aqueous rinse solution. The use of surfactants and specific materials utilized for such purpose are more fully described in U.S. Pat. No. 3,969,552 and Re. 32,240, the disclosures of each of which are expressly incorporated herein by reference. Suitable surfactants include classes of anionic surfactants, such as petroleum sulfonates, alkyl sulfonates or alkylaryl sulfonates and nonionic surfactants, such as, ethoxylated alkyl phenols, ethoxylated linear secondary alcohols, polyoxyethylene or polyoxypropylene glycols.

The invention may be further understood with reference to the following non-limiting examples. Percent weights are per the total composition unless otherwise specified.

EXAMPLES

Example 1

An anaerobic sealant composition according to the present invention (Composition One) was prepared with the following formulation:

TABLE 1

| Composition One | WT % |
|---|---|
| Triethyleneglycol dimethacrylate | 74.00 |
| Lauryl methacrylate | 15.00 |
| Hydroxpropyl methacrylate | 5.00 |
| Surfactant | 5.24 |
| Fluorescence | 0.02 |
| Inhibitor | 0.04 |
| Benzosulfimide (saccharin) | 0.30 |
| t-butyl hydroperoxide | 0.40 |
| Total: | 100.00 |

A lapshear, such as a metal lapshear (1"×4"×1/16") in accordance with ASTM D-1002, was coated with the above inventive composition. The coated lapshear was repeatedly dipped into room temperature tap water to clean the coated lapshear to yield a base dipping requirement to clean the lapshear. Glycerol dimethacry late was then combined with inventive Composition One at various levels as shown below and the cleaning procedure was repeated. As illustrated in the below results in Table 2, including glycerol dirnethacrylate in the Composition One increased the washability thereof, as evidenced in a decrease in dips required for cleaning. These compositions proved to have particular efficacy as an impregnation composition.

TABLE 2

| Glycerol Dimethacrylate Incorporated into Inventive Composition One, WT % | Number of Dips into 27° C. Tap Water to Clean Coated Lapshear |
|---|---|
| 0 | 50+ |
| 1 | 35 |
| 3 | 35 |
| 5 | 35 |
| 7 | 25 |
| 9 | 20 |
| 15 | 20 |

Example 2

An anaerobic sealant composition according to the present invention (Composition Two) was prepared with the following formulation:

TABLE 3

| Composition Two | WT % |
|---|---|
| Butanediol dimethacrylate | 50.00 |
| Triallyl Cyanurate | 30.00 |
| Lauryl methacrylate | 19.04 |
| Fluorescence | 0.02 |
| Inhibitor | 0.04 |
| Saccharin | 0.30 |
| 70% t-butyl hydroperoxide | 0.60 |
| Total: | 100.00 |

A lapshear, as described above in Example 1, was coated with the above composition. The coated lapshear was repeatedly dipped into room temperature tap water to clean the coated lapshear to yield a base dipping requirement to clean the lapshear. Glycerol dimethacrylate was then combined with inventive Composition Two at various levels as shown below and the cleaning procedure was repeated. As illustrated in the results below, incorporating glycerol dimethacrylate late in the composition increased the washability thereof, as evidenced by the decrease in number of dips required for cleaning. These compositions proved to have particular as an impregnation composition.

TABLE 4

| Glycerol Dimethacrylate Incorporated into Inventive Composition Two, WT % | Number of Dips into 27° C. Tap Water to Clean Coated Lapshear |
|---|---|
| 0 | 50+ |
| 1 | 15 |
| 3 | 13 |
| 5 | 10 |
| 7 | 8 |
| 9 | 8 |

Example 3

The anaerobic sealant composition (Composition Two) of Example 2 was used in the following washability study.

A lapshear, as described above in Example 1, was coated with the above composition. The coated lapshear was repeatedly dipped into room temperature tap water to clean the coated lapshear to yield a base dipping requirement to clean the lapshear. Ethoxylated glycerol was then combined with the sealant composition at various levels as shown below and the cleaning procedure was repeated. As illustrated in the below results in Table 5, including ethoxylated glycerol in the composition increased the washability thereof, as evidenced by a decrease in the number of dips required for cleaning. These compositions proved to have particular efficacy as an impregnation composition.

TABLE 5

| Ethoxylated Glycerol Incorporated into Inventive Composition Two, WT % | Number of Dips into 27° C. Tap Water to Clean Coated Lapshear |
|---|---|
| 0 | 50+ |
| 1 | 40 |
| 3 | 20 |
| 5 | 13 |

TABLE 5-continued

| Ethoxylated Glycerol Incorporated into Inventive Composition Two, WT % | Number of Dips into 27° C. Tap Water to Clean Coated Lapshear |
|---|---|
| 7 | 13 |
| 9 | 10 |

Example 4

The anaerobic sealant composition (Composition Two) of Example 2 was used in the following washability study.

A lapshear, as described above in Example 1, was coated with the above sealant composition. The coated lapshear was repeatedly dipped into room temperature tap water to clean the coated lapshear to yield a base dipping requirement to clean the lapshear. Propoxylated glycerol was then combined with the sealant composition at various levels as shown below and the cleaning procedure was repeated. As illustrated in the below results in Table 6, including propoxylated glycerol in the sealant composition increased the washability thereof, as evidenced by a decrease in the number of dips required for cleaning. These compositions proved to have particular efficacy as an impregnation composition.

TABLE 6

| Propoxylated Glycerol Incorporated into Inventive Composition Two, WT % | Number of Dips into 27° C. Tap Water to Clean Coated Lapshear |
|---|---|
| 0 | 50+ |
| 1 | 17 |
| 3 | 15 |
| 5 | 12 |
| 7 | 10 |
| 9 | 10 |

Example 5

An anaerobic sealant composition according to the present invention (Composition Three) was prepared with the following formulation:

TABLE 7

| Inventive Composition Three | Anaerobic Sealant, WT % |
|---|---|
| Glycerol dimethacrylate | 97.0 |
| cumene hydroperoxide | 3.0 |
| Total: | 100.0 |

Two drops, or about 0.4 grams, of the inventive composition was placed on a lapshear, as described in Example 1. A second lapshear was placed over the inventive composition, and the two lapshears were clamped together. A fixture test was then preformed at periodic time intervals. For the fixture test the two lapshears were unclamped at a particular time period. If the lapshears could move relative to one and the other, the inventive composition did not fully cure. The two lapshear would be reclamped until the next time interval. If the two unclamped lapshears could not moved relative to one and the other, then the inventive composition did fully cure. As illustrated below results in Table 8, the inventive composition anaerobically cured and proved to have particular efficacy as an impregnation composition with improved washability characteristics.

TABLE 8

| Inventive Composition Three | Room Temperature Anaerobic Curing |
|---|---|
| 1 hour after assembly | Not Cured |
| 2 hours after assembly | Not Cured |
| 3 hours after assembly | Not Cured |
| 4 hours after assembly | Fully Cured |

Example 6

An anaerobic sealant composition according to the present invention (Composition Four) was prepared with the following formulation:

TABLE 9

| Inventive Composition Four | Anaerobic Sealant, WT % |
|---|---|
| Glycerol dimethacrylate | 96.7 |
| cumene hydroperoxide | 3.0 |
| Benzosulfimide (saccharin) | 0.3 |
| Total: | 100.0 |

Two drops, or about 0.4 grams, of the inventive composition was used for a fixture test, as described in Example 5, with two lapshears. Saccharin proved to be an effective accelerator for aerobically curing the inventive composition. As illustrated below results in Table 10, the inventive composition anaerobicly cured and proved to have particular efficacy as an impregnation composition with improved washability characteristics.

TABLE 10

| Inventive Composition Four | Room Temperature Anaerobic Curing |
|---|---|
| 1 hour after assembly | Fully Cured |

Example 7

An anaerobic sealant composition according to the present invention (Composition Five) was prepared by adding 1 gram of copper octanoate to 100 grams of Inventive Composition Four of Example 6. Two drops, or about 0.4 grams, of the inventive composition was used for a fixture test, as described in Example 5, with two lapshears. Copper octanoate proved to be an effective accelerator for aerobically curing the inventive composition. As illustrated below results in Table 11, the inventive composition anaerobicly cured and proved to have particular efficacy as an impregnation composition with improved washability characteristics.

TABLE 11

| Inventive Composition Five | Room Temperature Anaerobic Curing |
|---|---|
| 20 minutes after assembly | Fully Cured |

Example 8

An anaerobic sealant composition according to the present invention (Composition Six) was prepared with the following formulation:

TABLE 12

| Inventive Composition Six | Anaerobic Sealant, WT % |
| --- | --- |
| Glycerol dimethacrylate | 77.0 |
| Lauryl methacrylate | 10.0 |
| Hydroxypropyl methacrylate | 10.0 |
| cumene hydroperoxide | 3.0 |
| Total: | 100.0 |

Two drops, or about 0.4 grams, of the inventive composition was used for a fixture test, as described in Example 5, with two lapshears. As illustrated below results in Table 13, the inventive composition anaerobicly cured and proved to have particular efficacy as an impregnation composition with improved washability characteristics.

TABLE 13

| Inventive Composition Six | Room Temperature Anaerobic Curing |
| --- | --- |
| 1 hour after assembly | Not Cured |
| 2 hours after assembly | Not Cured |
| 3 hours after assembly | Not Cured |
| 4 hours after assembly | Not Cured |
| 5 hours after assembly | Not Cured |
| 6 hours after assembly | Not Cured |
| 7 hours after assembly | Partially Cured |

Example 9

An heat curable sealant composition according to the present invention (Composition Seven) was prepared with the following formulation:

TABLE 14

| Inventive Composition Seven | Heat Curable Sealant, WT % |
| --- | --- |
| Glycerol dimethacrylate | 97.0 |
| cumene hydroperoxide | 3.0 |
| Total: | 100.0 |

Two drops, or about 0.4 grams, of the inventive composition was placed on a lapshear, as described in Example 1. A second lapshear was placed over the inventive composition, and the two lapshears were clamped together. The assembly was placed in an oven and maintained at 121° C. A fixture test, as described in Example 5, was then preformed after one hour. As illustrated below results in Table 15, the inventive composition thermally cured at 121° C. and proved to have particular efficacy as an impregnation composition with improved washability characteristics.

TABLE 15

| Inventive Composition Seven | 121° C. Heat Curing |
| --- | --- |
| 1 hour after assembly | Fully Cured |

Example 10

A heat curable sealant composition according to the present invention (Composition Eight) was prepared with the following formulation:

TABLE 16

| Inventive Composition Eight | Heat Curable Sealant, WT % |
| --- | --- |
| Glycerol dimethacrylate | 96.7 |
| cumene hydroperoxide | 3.0 |
| Benzosulfimide (saccharin) | 0.3 |
| Total: | 100.0 |

Two drops, or about 0.4 grams, of the inventive composition was used for a fixture test, as described in Example 9, with two lapshears. As illustrated below results in Table 17, the inventive composition thermally cured at 121° C. and proved to have particular efficacy as an impregnation composition with improved washability characteristics.

TABLE 17

| Inventive Composition Eight | 121° C. Heat Curing |
| --- | --- |
| 1 hour after assembly | Fully Cured |

Example 11

A heat curable sealant composition according to the present invention (Composition Nine) was prepared with the following formulation:

TABLE 18

| Inventive Composition Nine | Heat Curable Sealant, WT % |
| --- | --- |
| Glycerol dimethacrylate | 77.0 |
| Lauryl methacrylate | 10.0 |
| Hydroxypropyl methacrylate | 10.0 |
| cumene hydroperoxide | 3.0 |
| Total: | 100.0 |

Two drops, or about 0.4 grams, of the inventive composition was used for a fixture test, as described in Example 9, with two lapshears. As illustrated below results in Table 19, the inventive composition thermally cured at 121° C. and proved to have particular efficacy as an impregnation composition with improved washability characteristics.

TABLE 17

| Inventive Composition Nine | 121° C. Heat Curing |
|---|---|
| 1 hour after assembly | Fully Cured |

The invention being thus described, it will be clear to those persons of skill in the art that the same may be varied in many ways. Such variations are not to be regarded as a departure from the spirit and scope of the invention and all such modifications are intended to be included within the scope of the claims.

What is claimed is:

1. A free-radical curable composition which is washable and self-emulsifiable upon mixing with water comprising:
   (a) a curable glycerol composition having the formula:

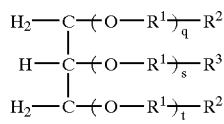

wherein $R^1$ is a $C_1$ to $C_5$ alkylene; $R^2$ and $R^3$ are independently selected from the group consisting of hydroxyl, (meth)acrylate and combinations thereof; q, s and t are independently from about 0 to about 35; provided that at least one of said $R^2$ is said (meth)acrylate; at least one q, s or t, is not zero and that at least one of said $R^1$ is ethyl or propyl; and
   (b) a free radical initiator to initiate cure of said composition, wherein said free radical initiator includes a heat-curing initiator to produce free radicals by thermal decomposition to cure said sealant.

2. The composition of claim 1 wherein the heat-curing initiator is selected from the group consisting of a peroxide, a hydroperoxide, a perester, an azonitrile and combinations thereof.

3. A free-radical curable composition which is washable and self-emulsifiable upon mixing with water comprising:
   (a) a curable glycerol composition having the formula:

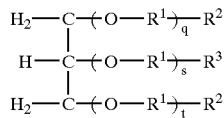

wherein $R^1$ is a $C_1$ to $C_5$ alkylene; $R^2$ and $R^3$ are independently selected from the group consisting of hydroxyl, (meth)acrylate and combinations thereof; q, s and t are independently from about 0 to about 35; provided that at least one of said $R^2$ is said (meth)acrylate; at least one q, s or t, is not zero and that at least one of said $R^1$ is ethyl or propyl; and
   (b) a free radical initiator to initiate cure of said composition, wherein said free radical initiator includes an anaerobic-curing initiator to produce free radicals upon the exclusion of oxygen to cure said sealant.

4. The composition of claim 3 wherein said anaerobic-curing initiator is a peroxy initiator selected from the group consisting of hydroperoxides, peroxides, peresters and combinations thereof.

5. The composition of claim 3 wherein said anaerobic-curing initiator includes an anaerobic accelerator selected from the group consisting of tributyl amine, benzoic sulfimide, formamide, copper octanoate and combinations thereof.

6. The composition of claim 1 further including a poly (meth)acrylate ester having the formula:

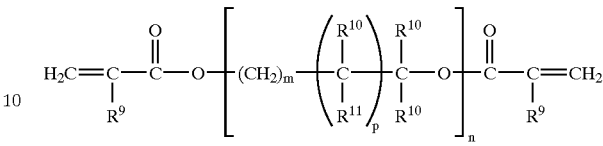

wherein $R^{10}$ represents a radical selected from the group consisting of hydrogen, lower alkyl of from 1 to about 4 carbon atoms, hydroxyalkyl of from 1 to about 4 carbon atoms and

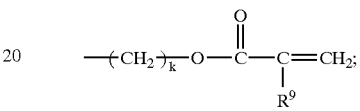

$R^9$ is a radical selected from the group consisting of hydrogen, halogen, and lower alkyl of from 1 to about 4 carbon atoms; $R^{11}$ is a radical selected from the group consisting of hydrogen, hydroxyl and

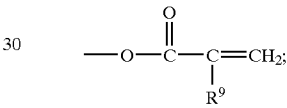

m is 0 to about 12, n is equal to at least 1, k is 1 to about 4 and p is 0 or 1.

7. The composition of claim 1 further including a monofunctional acrylate ester, said monofunctional acrylate ester being selected from the group consisting of lauryl methacrylate, cyclohexylmetharylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

8. The composition of claim 1 further including an ionic surfactant, an anionic surfactant and combinations thereof.

9. The composition of claim 1 wherein $R^1$ is ethyl, propyl or a combination thereof.

10. A method of anaerobically or thermally sealing a porous article comprising:
    (a) selecting a curable glycerol composition having the formula:

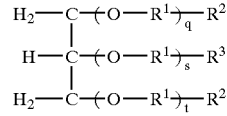

wherein $R^1$ is a $C_1$ to $C_5$ alkyl or combinations thereof; $R^2$ and $R^3$ are independently selected from the group consisting of hydroxyl, (meth)acrylate and combinations thereof; q, s and t are independently from about 0 to about 35; provided that at least one of said $R^2$ is said (meth)acrylate; at least one q, s or t, is not zero and that at least one of said $R^1$ is ethyl or propyl; and
    (b) selecting a free radical initiation to initiate curing of said curable glycerol;

(c) impregnating pores of said article with said curable glycerol and said initiator, and (d) washingsaid curable glycerol from a surface of said article in a wash tank containing an aqueous solution.

11. The composition of claim 3 further including a poly(meth)acrylate ester having the formula:

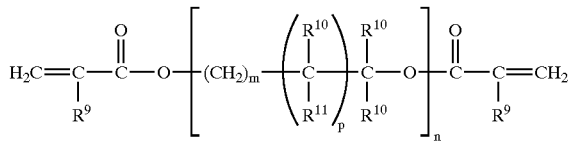

wherein $R^{10}$ represents a radical selected from the group consisting of hydrogen, lower alkyl of from 1 to about 4 carbon atoms, hydroxyalkyl of from 1 to about 4 carbon atoms and

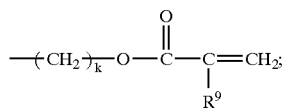

$R^9$ is a radical selected from the group consisting of hydrogen, halogen, and lower alkyl of from 1 to about 4 carbon atoms; $R^{11}$ is a radical selected from the group consisting of hydrogen, hydroxyl and

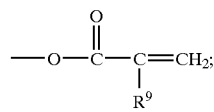

m is 0 to about 12, n is equal to at least 1, k is 1 to about 4 and p is 0 or 1.

12. The composition of claim 3 further including a monofunctional acrylate ester, said monofunctional acrylate ester being selected from the group consisting of lauryl methacrylate, cyclohexylmetharylate, tetrahydrofurfuryl methacrylate, hydroxyethyl acrylate, hydroxypropyl methacrylate, t-butylaminoethyl methacrylate, cyanoethylacrylate, chloroethylmethacrylate and combinations thereof.

13. The composition of claim 3 further including an ionic surfactant, an anionic surfactant and combinations thereof.

14. The composition of claim 3 wherein $R^1$ is ethyl, propyl or a combination thereof.

* * * * *